United States Patent [19]

Miyazaki

[11] Patent Number: 4,633,694

[45] Date of Patent: Jan. 6, 1987

[54] AUTOMATIC CONTROL ON STRIP CONTINUOUS PROCESSING LINES

[76] Inventor: Kazuo Miyazaki, R. Argelia, 39, Cariru, Ipatinga, MG, Brazil

[21] Appl. No.: 701,156

[22] Filed: Feb. 13, 1985

[51] Int. Cl.[4] .............................................. B21B 37/00
[52] U.S. Cl. ..................................................... 72/9; 226/8
[58] Field of Search .................... 226/8, 24, 29, 42, 43, 226/9, 122, 123; 72/7, 8, 9, 224, 225, 226, 221, 227, 234

[56] References Cited

U.S. PATENT DOCUMENTS

| | | | |
|---|---|---|---|
| 1,792,287 | 2/1931 | Dean | 72/234 X |
| 2,051,018 | 8/1936 | Umansky | 72/9 |
| 2,153,429 | 4/1939 | Millan et al. | 72/234 X |
| 3,151,507 | 10/1964 | Canova et al. | 72/205 X |
| 3,151,508 | 10/1964 | Holman et al. | 72/23 X |
| 3,289,441 | 12/1966 | Takuma | 72/229 X |
| 3,362,601 | 1/1968 | Ford et al. | 226/122 |
| 3,438,557 | 4/1969 | Lehmann | 226/8 |
| 3,487,986 | 1/1970 | Nelson et al. | 226/42 |
| 3,762,194 | 10/1973 | Maxwell | 72/29 X |
| 3,879,125 | 4/1975 | Schroter et al. | 226/24 X |
| 4,096,487 | 6/1978 | Schafer | 346/110 R |
| 4,406,389 | 9/1983 | Mowry, Jr. et al. | 226/29 |

Primary Examiner—Donald Watkins

[57] ABSTRACT

Gradual acceleration/deceleration of continuous strip processing lines is achieved by suspending manual selected acceleration/deceleration control in favor of predetermined low acceleration/deceleration rates when the line speed is below a pre-established value. Line speed is monitored as a function of the amplitude of a control signal used to drive an amplitude-responsive, variable speed motor. The control signal is derived from an integrator used to integrate a command signal level representing the operator-selected acceleration/deceleration rate. When the control signal amplitude is below a pre-established value, a reference signal level, representing a lower acceleration/deceleration rate than that selected by the operator, is applied to the integrator in lieu of the command signal. A plurality of gradually increasing acceleration rates may be automatically effected until the speed of the continuous strip processing line achieves a pre-established level.

6 Claims, 6 Drawing Figures

AUTOMATIC CONTROL ON STRIP CONTINUOUS PROCESSING LINES

BACKGROUND OF THE INVENTION

1. Technical Field

The present invention relates to acceleration and deceleration control to effect speed synchronization between different continuous strip processing lines forming part of a plural strip assembly in, for example, a rolling mill plant. More particularly, the present invention relates to control of acceleration/deceleration of such continuous strip processing lines at the onset of acceleration and at the end of a deceleration procedure.

2. Discussion of the Prior Art

In continuous strip processing lines, one of the more important factors to be considered, in order to obtain proper operation of a rolling mill plant, for example, is the synchronization of speeds between the various continuous strip lines employed in the plant process. Speed synchronization should be maintained throughout the entire time of line operation, not only under steady state conditions, but also during transient states, such as acceleration and deceleration.

The critical times for obtaining proper speed synchronism occur at the onset of acceleration and at the end of a deceleration phase. This is due to the fact that control at low speeds does not result in proper performance; rather, the lack of synchronization at low speeds results in undesirable conditions such as loosening of parts, variations of frictional states (from dynamic to static, or vice versa), actuation of brakes, etc.

SUMMARY OF THE INVENTION

In accordance with the present invention the speeds of different continuous strip assemblies in an overall plant process are synchronized during acceleration and deceleration of the strips. This is effected by automatic determination of the most suitable acceleration/deceleration rates for given situations, thereby avoiding line jerks, overloads, warping of drive shafts, breakage of material being processed, etc. In a preferred embodiment, an acceleration/deceleration selector provides a command signal at an amplitude corresponding to the desired acceleration/deceleration rate. One or more reference signals are also established, each having a respective amplitude below the amplitudes of the selectable command signals. The command signal is normally integrated to provide a control signal which increases to a final value at a rate determined by the command signal amplitude. When the control signal amplitude is below a first pre-established level, the system selects the lowest reference signal, in place of the command signal, to be integrated. As the control signal passes other pre-established levels, different reference signals of increasing amplitude are integrated to assure gradually increasing acceleration rates. When the control signal reaches a further pre-established amplitude level, the command signal is integrated to place the operator-selected acceleration rate into effect. A polarity selector is provided to reverse the process during deceleration.

DESCRIPTION OF THE PREFERRED EMBODIMENT

Figure 1:
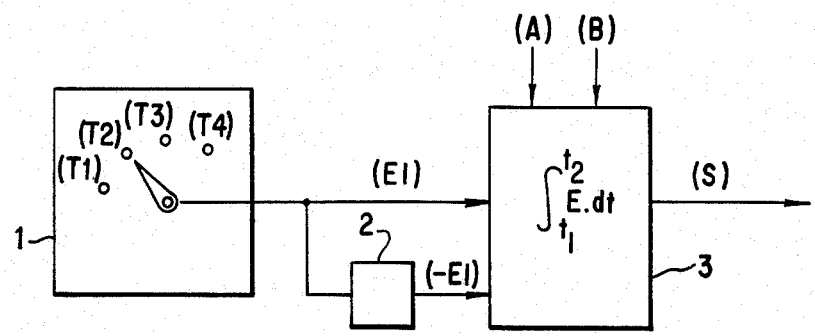
FIG. 1 is a schematic diagram of a prior art acceleration/deceleration selector circuit for a continuous strip processing line.

Referring specifically to the prior art acceleration/deceleration selector circuit illustrated in FIG. 1, reference numeral 1 designates a manual acceleration/deceleration step selector switch having, for example, four positions T1, T2, T3 and T4. For each position, selector switch 1 provides a respective command signal level E1. A polarity inverter 2 inverts the E1 signal amplitude to provide an inverted signal $-E1$.

Both signals E1 and $-E1$ are applied to an integrator 3 which functions to provide a control signal S to drive a driver device (e.g, a motor) for the continuous strip processing line.

In operation of the circuit of FIG. 1, the operator selects one of the acceleration/deceleration steps T1–T4 by means of selector switch 1 in order to optimize operating conditions to the extent permitted by the system. Signal E1 is a different present voltage level for each acceleration step, and signal $-E1$ corresponds to deceleration. Signal A and D control which of signals E1 and $-E1$ is integrated by integrator 3 during the appropriate period from $t_1$ to $t_2$. In other words, when signal A is active, signal E1 is integrated to provide acceleration; when signal D is active, signal $-E1$ is selected to effect deceleration. Control signal S is provided by the integrator at an amplitude corresponding to the integral of the amplitude of the applied command signal E1 or $-E1$.

Figure 2:
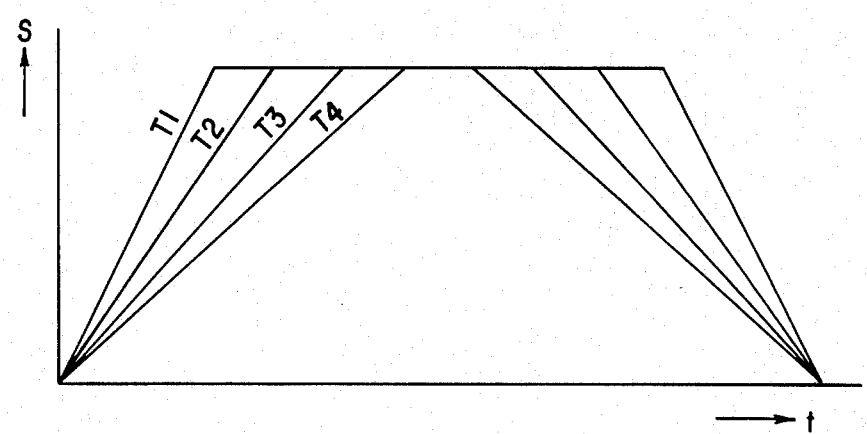
FIG. 2 is a plot of the various acceleration/deceleration characteristics achievable by the prior art circuit of FIG. 1 and is represented as a plot of the driver control signal amplitude versus time.

FIG. 2 illustrates the possible acceleration/deceleration characteristics provided by the prior art circuit of FIG. 1. As indicated, the acceleration rate is proportional to the rate of change of the amplitude of signal S with time.

Figure 3:
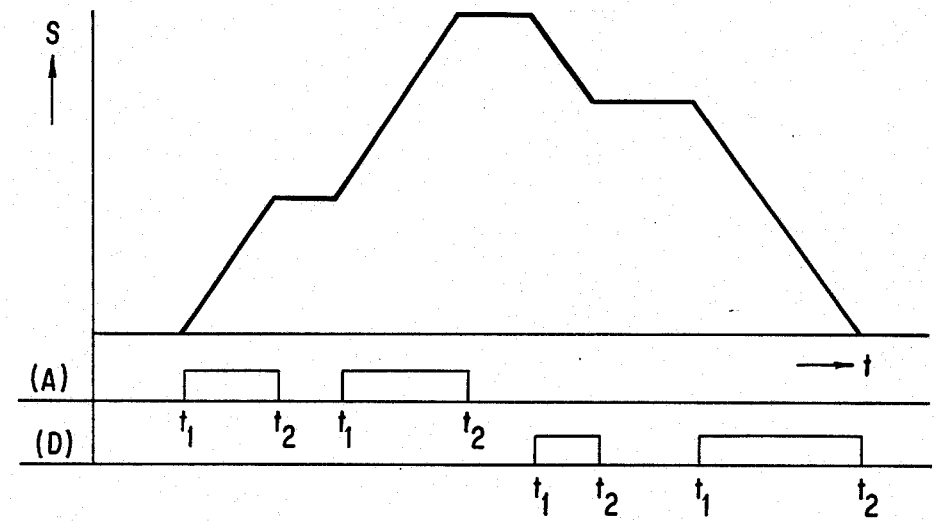
FIG. 3 is a plot of a typical acceleration/deceleration sequence in the circuit of FIG. 1, and illustrates the manner in which acceleration or deceleration may be selected.

FIG. 3 illustrates the relationship between acceleration/deceleration and signals A and D. As illustrated, when signal A is activated, acceleration is effected, the acceleration rate being the rate (T1, T2, T3, T4) selected at selector switch 1. When signal D is active, deceleration is effected, the deceleration rate being the rate selected at selector switch 1.

The acceleration/deceleration rate and its effective time period are generally selected to achieve the highest acceleration/deceleration rate consistent with system operating conditions. As a result, it is critical to obtain proper speed synchronization of system component along the overall processing line, particularly upon starting and stopping of the line. A lack of synchronization between the various components causes severe jerks along the line which, in turn, reduce the operating life of the components and thereby result in overload, roll warping, shaft breakage, shearing of couplings, and, in the most severe cases, breakage of the material being processed.

Figure 4:
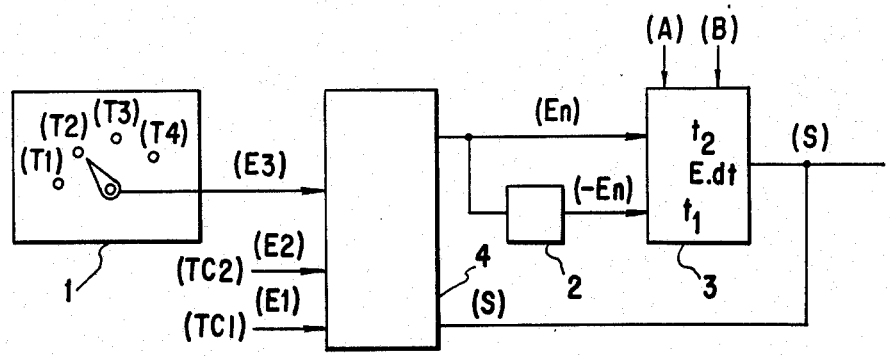
FIG. 4 is a schematic diagram of an acceleration/deceleration selector circuit for a continuous strip processing line in accordance with the present invention.

The system according to the present invention utilizes more than one acceleration/deceleration ratio for each start/stop condition. The system is illustrated in FIG. 4 to which specific reference is now made. Reference numeral 1 designates the acceleration/deceleration rate manual selector switch. This switch, along with polarity inverter 2 and integrator 3 are the same components as utilized in the prior art circuit of FIG. 1. A rate automatic step selector switch 4 is also provided and serves to determine whether the command signal E3, as selected by the selector switch 1, or either of two threshold level signals E1 or E2, are applied for integration to integrator 3.

In operation, the operator manually selects the desired acceleration/deceleration rate by means of selector switch 1. Upon selection of the desired acceleration/deceleration rate, a corresponding command signal level E3 is provided and is fed to the rate step selector switch 4. In addition, the rate step selector 4 receives the threshold level signals E1 and E2 corresponding to acceleration rates TC1 and TC2. These rates are automatically placed into effect at the onset of starting and at the end of stopping of the continuous strip line. In the particular embodiment illustrated in FIG. 4, signals E1, E2 and E3 are alternatively selected for integration as a function of the amplitude of control signal S (i.e., the line speed reference signal) at each instant of time.

Figure 5:
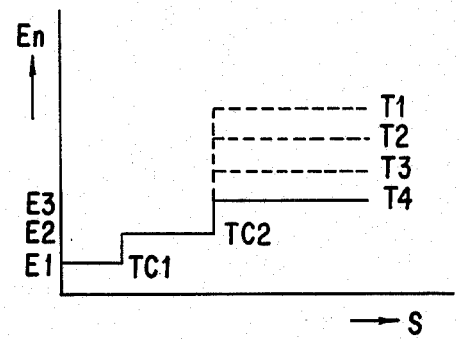
FIG. 5 is an exemplary ploy of various command signal amplitudes and threshold amplitude levels for the circuit of FIG. 4.
Figure 6:
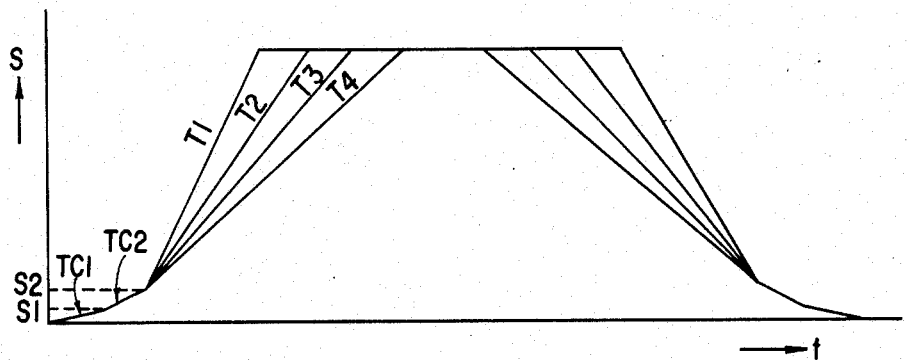
FIG. 6 is a plot of the various acceleration/deceleration characteristics actuable by the circuit of FIG. 4 showing the driver control signal amplitude plotted as a function of time.

FIG. 5 illustrates an example of the relationship between signal S and signal En, the latter being the signal level selected by rate automatic step selector 4 from the three signals E1, E2 and E3. FIG. 6 illustrates the acceleration/deceleration characteristics achievable in accordance with the present invention and represented as a plot of the amplitude of signal S versus time. FIGS. 5 and 6, along with FIG. 4, should be referred to upon reading the following operational description.

The rate automatic step selector switch 4 establishes two threshold levels S1 and S2 to which the amplitude of signal S is compared. When the amplitude of signal S is below or equal to the threshold level S2, the acceleration/deceleration characteristics of the circuit are rendered independent of the acceleration/deceleration rate selected by the operator at selector switch 1 (as indicated in FIG. 6). When the amplitude of signal S is below or equal to the pre-established reference level S1, acceleration of the continuous strip is maintained at TC1 which is a lower rate than the minimum acceleration/deceleration rate T4 selectable at selector switch S1. Thus, a smooth drive transition is effected, rendering speed control simple to attain and providing conditions for optimal operation of the system. The acceleration/deceleration rate TC2 serves a similar purpose to that served by rate TC1 but is a slightly higher rate. Thus, for amplitude values of signal S between S1 and S2, the actual acceleration rate is TC2, not the rate selected at selector switch 1. When the amplitude of signal S is higher than the pre-established threshold level S2, the actual acceleration/deceleration rate is that selected by the operator via the step selector switch 1.

I claim:

1. Apparatus for controlling the acceleration and deceleration of a continuous strip processing line, said apparatus comprising:
    variable speed drive means responsive to an applied control signal for moving said continuous strip processing line at a velocity determined by the amplitude of said control signal;
    actuable selector means for providing a drive command signal at a plurality of alternatively selectable amplitude levels;
    integrator means for receiving and integrating an applied command signal and generating said control signal at an amplitude which is the integral of the applied command signal;
    means for providing at least one reference command signal of a first predetermined threshold level, said first predetermined threshold level being lower than each of said plurality of alternatively selectable amplitude levels of said drive command signal; and
    automatic command signal selector means comparing the signal levels of said control signal and said reference command signal and applying said at least one reference command signal to said integrator means to the exclusion of said drive command signal when said control signal amplitude is below said first predetermined threshold level but applying said drive command signal to said integrator means to the exclusion of said reference command signal when the amplitude of said control signal exceeds said first predetermined threshold level, thereby providing a smooth transition from constant speed operation at the onset of acceleration or deceleration.

2. The apparatus according to claim 1 wherein said means for providing a reference command signal further provides a second reference command signal at a second predetermined threshold level higher than said first predetermined threshold level but lower in amplitude than each of said plurality of alternatively selectable amplitude levels of said drive command signal; and
    wherein said automatic command signal selector means includes means for applying said second reference command signal to said integrator means to the exclusion of said drive command signal and said at least one reference command signal when said control signal amplitude is below said second predetermined threshold level but higher than said first predetermined threshold level and applying said drive command signal to said integrator means to the exclusion of both said reference command signals when the amplitude of said control signal exceeds said second predetermined threshold level.

3. The apparatus according to claim 2 and further comprising polarity inverter means for selectively inverting the polarity of the drive command and reference command signals applied to said integrator means for alternately effecting both acceleration and deceleration.

4. A method for controlling the acceleration and deceleration of a continuous strip processing line, said method comprising:
    moving said continuous strip processing line at a velocity determined by the amplitude of an applied control signal;
    generating a drive command signal at a plurality of alternatively selectable amplitude levels;

integrating said applied command signal in integrator means and generating thereby said control signal at an amplitude which is the integral of the applied command signal;

providing at least one reference command signal of a first predetermined threshold level, said first predetermined threshold level being lower than each of said plurality of alternatively selectable amplitude levels of said drive command signal; and comparing the signal levels of said control signal and said reference command signal and applying said at least one reference command signal to said integrator means to the exclusion of said drive command signal when said control signal amplitude is below said first predetermined threshold level but applying said drive command signal to said integrator means to the exclusion of said reference command signal when the amplitude of said control signal exceeds said first predetermined threshold level, thereby providing a smooth transition from constant speed operation at the onset of acceleration or deceleration.

5. The method according to claim 4 wherein said step of providing a reference command signal further comprises providing a second reference command signal at a second predetermined threshold level higher than said first predetermined threshold level but lower in amplitude than each of said plurality of alternatively selectable amplitude levels of said drive command signal; and applying said second reference command signal to said integrator means to the exclusion of said drive command signal and said at least one reference command signal when said control signal amplitude is below said second predetermined threshold level but higher than said first predetermined threshold level and applying said drive command signal to said integrator means to the exclusion of both said reference command signals when the amplitude of said control signal exceeds said second predetermined threshold level.

6. The method according to claim 5 and further comprising the step of selectively inverting the polarity of the drive and reference command signals applied to said integrator means for alternately effecting both acceleration and deceleration.

* * * * *